(12) United States Patent
Kasher et al.

(10) Patent No.: US 10,075,323 B2
(45) Date of Patent: Sep. 11, 2018

(54) INTERLEAVING AND DEINTERLEAVING SOURCE DATA FOR SINGLE CARRIER MODULATION AND CODING SCHEMES

(71) Applicant: Intel IP Corporation, Santa Clara, CA (US)

(72) Inventors: Assaf Kasher, Haifa (IL); Michael Genossar, Modiin (IL); Maxim Greenberg, Atlit (IL); Vladimir Kravtsov, Jerusalem (IL)

(73) Assignee: Intel IP Corporation, Santa Clara, CA (US)

( * ) Notice: Subject to any disclaimer, the term of this patent is extended or adjusted under 35 U.S.C. 154(b) by 294 days.

(21) Appl. No.: 14/757,816

(22) Filed: Dec. 26, 2015

(65) Prior Publication Data

US 2017/0111205 A1  Apr. 20, 2017

Related U.S. Application Data

(60) Provisional application No. 62/241,689, filed on Oct. 14, 2015.

(51) Int. Cl.
| | |
|---|---|
| *H04L 27/36* | (2006.01) |
| *H04L 5/00* | (2006.01) |
| *H04L 27/26* | (2006.01) |

(52) U.S. Cl.
CPC .......... *H04L 27/361* (2013.01); *H04L 5/0053* (2013.01); *H04L 27/2605* (2013.01); *H04L 27/2636* (2013.01)

(58) Field of Classification Search
None
See application file for complete search history.

(56) References Cited

U.S. PATENT DOCUMENTS

| | | | | |
|---|---|---|---|---|
| 2004/0120274 A1* | 6/2004 | Petre | ....................... | H04B 7/04 370/320 |
| 2009/0125780 A1* | 5/2009 | Taylor | ................ | H03M 13/1137 714/752 |

(Continued)

OTHER PUBLICATIONS

International Search Report and Written Opinion for PCT Application No. PCT/US2016/054428, dated Jan. 13, 2017, 10 pages.

*Primary Examiner* — Nicholas Sloms
(74) *Attorney, Agent, or Firm* — Eversheds Sutherland (US) LLP

(57) ABSTRACT

This disclosure describes methods, devices, and systems related to interleaving and deinterleaving symbols used in single carrier modulation and coding schemes. A device is disclosed comprising at least one memory storing computer-executable instructions, and at least one processor configured to access the at least one memory. The at least one processor is further configured to execute the computer-executable instructions to: receive a source data bit string from the at least one memory, scramble the source data bit string, parse the scrambled source data bit string into a plurality of segments, assign a portion of the plurality of segments to a Single Carrier-Block (SC-BLK), and encode the portion of the plurality of segments into a code word, wherein the code word comprises a plurality of bit groups, and each bit group comprises one or more bits. The at least one processor is further configured to determine a number of modulation symbols based at least in part on group size; map each of the plurality of bit groups to a corresponding modulation symbol; group the modulation symbols into an interleaved symbol block associated with the SC-BLK; group the plurality of modulation symbols in the interleaved symbol block into a second code word that corresponds to the first code word; and transmit a packet comprising the interleaved symbol block.

18 Claims, 14 Drawing Sheets

(56) References Cited

U.S. PATENT DOCUMENTS

| | | |
|---|---|---|
| 2010/0272203 A1 | 10/2010 | Seyedi-Esfahani et al. |
| 2011/0002323 A1* | 1/2011 | Siaud ................ H03M 13/2764 |
| | | 370/345 |
| 2011/0317722 A1* | 12/2011 | Gaddam ............... H04L 1/0057 |
| | | 370/474 |
| 2012/0106619 A1 | 5/2012 | Kawauchi et al. |
| 2012/0195399 A1* | 8/2012 | Zhu ....................... H04L 1/0046 |
| | | 375/341 |
| 2013/0272461 A1* | 10/2013 | Lomayev .............. H04L 27/265 |
| | | 375/340 |
| 2014/0169424 A1 | 6/2014 | Kolze et al. |
| 2015/0155961 A1 | 6/2015 | Khoryaev et al. |
| 2017/0324500 A1* | 11/2017 | Myung ............. H03M 13/2778 |

\* cited by examiner

INTERLEAVING AND DEINTERLEAVING SOURCE DATA FOR SINGLE CARRIER MODULATION AND CODING SCHEMES

TECHNICAL FIELD

This disclosure generally relates to systems and methods for wireless communications and, more particularly, to usage of interleavers and deinterleavers for carrier modulation and coding schemes for wireless communications.

BACKGROUND

Wireless devices are increasingly requiring more bandwidth to support multiple network access requests by applications running on the wireless devices. As the number of wireless devices and applications requiring access to a wireless network increase, so does the amount of bandwidth the wireless network must provide in order to support the wireless devices and applications. One way to compensate for the increased number of wireless devices is to allocate a new frequency spectrum to the wireless devices that currently is not being used. One frequency band that is currently unoccupied and is being considered for next generation wireless networking is the 60 GHz frequency spectrum.

DETAILED DESCRIPTION

Figure 1:
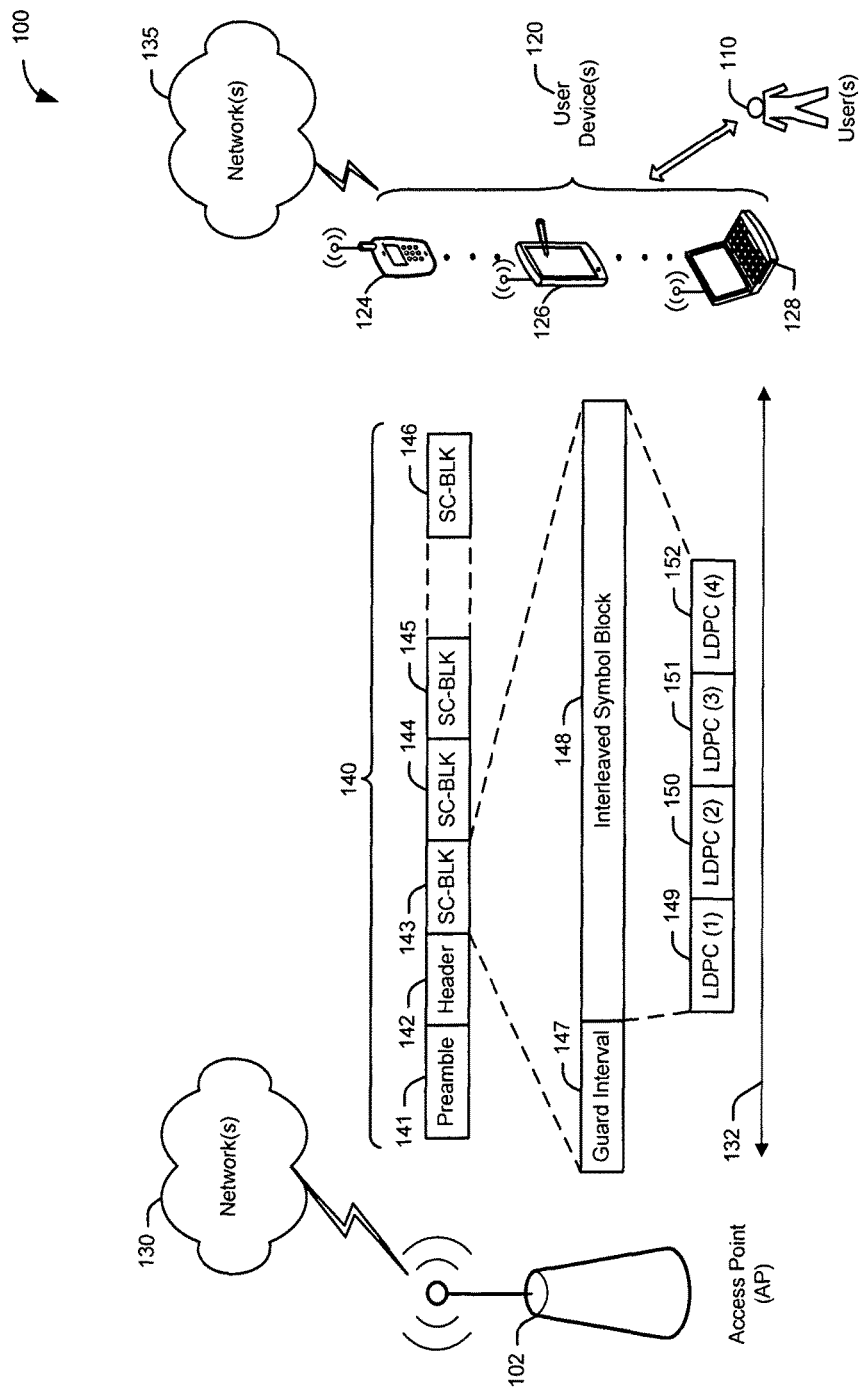
FIG. 1 depicts a network diagram illustrating an example network environment of an illustrative modulation and coding scheme system, in accordance with one or more example embodiments of the disclosure.

Example embodiments described herein provide certain systems, methods, and devices for providing signaling information to Wi-Fi devices in various Wi-Fi networks.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Current wireless devices contain one or more circuits (i.e., transceiver(s)) that may introduce noise to the signals that are sent and received by the wireless devices. One way to compensate for the noise introduced by the circuits is to include additional hardware (i.e., interleavers and deinterleavers) and software (i.e., firmware on the interleavers and deinterleavers) that compensate for the noise introduced by the transceivers. By adding these additional components to next generation wireless devices, the next generation wireless devices can operate in the 60 GHz frequency spectrum. As a result, a wireless network service provider can allocate a frequency spectrum used with existing wireless networking standards to a first subset of next generation wireless devices and non-next generation wireless devices, and allocate the 60 GHz spectrum to a second subset of next generation wireless devices.

Recent communication standards in the 60 GHz spectrum range may include one or more modulation and coding scheme codes (MCSs) other than those existing in the Institute for Electrical and Electronics Engineers (IEEE) 802.11ad standard. Some of these MCSs are based on a Single Carrier (SC) modulation using a 64 Quadrature Amplitude Modulation (QAM) with various code rates. Currently, interleavers are not used to encode information in a wireless device (e.g., a personal computing device or an access point) adhering to the IEEE 802.11ad standard before the information is transmitted by the wireless device. Interleavers may improve resilience to noise (e.g., phase noise) introduced by a transmission or reception component of a transceiver of a wireless device. In particular, interleaving symbols corresponding to source data (i.e., data generated by one or more applications on a transmitting device) on the transmitting device and deinterleaving the symbols when they are received on a receiving device significantly decreases the phase noise.

Wireless devices operating in the 60 GHz frequency spectrum may experience a considerable amount of noise introduced by the transmitter and receiver of the wireless device. In order to compensate for the noise, interleavers and deinterleavers may be added to the circuitry of the wireless devices to prevent the data transmitted between the wireless devices from being corrupted. Signals, especially those carried in higher modulation (e.g., 64 QAM), suffer from phase noise introduced by one or more electronic components of a transmitter and/or one or more electronic components of a receiver. Interleaving the data improves the resilience to phase noise.

The IEEE 802.11ad standard SC modulation defines a data packet that is divided into symbol blocks of 512 symbols. Of the 512 symbols, 64 symbols are reserved for a guard interval with a known signal, and the remaining 448 symbols carry data generated by an application or firmware residing on a mobile device that generated the data packet. The data may be encoded using a Low Density Parity Check (LDPC) code word. The LDPC code word may be 672 bits in length. When a 64 QAM modulation is used, there are 6 bits per symbol, and there are 2,688 (448 symbols*6 bits per symbol) bits per symbol block, resulting in 4 LDPC code words.

Because phase noise is a problem with existing wireless devices operating in the 60 GHz frequency spectrum, part of the phase noise can be estimated using the guard intervals of a known signal. The phase in each guard interval can be estimated because the signal is known. The phase noise in the data part can be estimated by linear interpolation of the phases of the guard intervals at the sides of the data part. This estimated phase noise can be removed from the received signal. The estimate is more accurate near the guard intervals, so that symbols close to the middle of the interval suffer from higher residual phase noise. This means that LDPC code words at the middle of the block of 448 symbols will have lower residual SNR. By interleaving the LDPC code words before inserting the symbols in the symbol block, and de-interleaving before decoding the LDPC codewords, each code word gets symbols that have the same average residual phase noise. This may enable a processor on a receiving wireless device, subject to phase noise, to properly reconstruct a message sent from a transmitting wireless device that is also subject to phase noise.

FIG. 1 is a network diagram illustrating an example network environment of an illustrative modulation and coding scheme system, according to some example embodiments of the present disclosure. Wireless network 100 may include one or more user devices 120 and one or more access points (AP) 102, which may communicate in accordance with IEEE 802.11 communication standards, including IEEE 802.11ay. User device(s) 120 may be mobile devices that are non-stationary and do not have fixed locations. In some embodiments, the user devices 120 and AP 102 may include one or more computer systems similar to that of the functional diagram of FIG. 15 and/or the example machine/system of FIG. 16. One or more of the user device(s) 120 may be operable by one or more user(s) 110. The user device(s) 120 (e.g., 124, 126, or 128) may include any suitable processor-driven user device including, but not limited to, a desktop user device, a laptop user device, a server, a router, a switch, an access point, a smartphone, a tablet, a wearable wireless device (e.g., bracelet, watch, glasses, ring, etc.) and so forth.

Any of the user device(s) 120 (e.g., user devices 124, 126, 128) and AP 102 may be configured to communicate with each other via one or more communications networks 130 and/or 135, via one or more wireless and/or wired communication links. Any of the communications networks 130 and/or 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP 102 may include one or more communications antennas. The communications antenna may be any suitable type of antenna corresponding to the communications protocols used by the user device(s) 120 (e.g., user devices 124, 126, and 128) and AP 102. Some non-limiting examples of suitable communications antennas include Wi-Fi antennas, IEEE 802.11 family of standards compatible antennas, directional antennas, non-directional antennas, dipole antennas, folded dipole antennas, patch antennas, multiple-input multiple-output (MIMO) antennas, phased array antennas, or the like. The communications antenna may be communicatively coupled to a radio component to transmit and/or receive signals, such as communications signals, to and/or from the user devices 120.

Any of the user devices 120 (e.g., user devices 124, 126, 128) and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the IEEE 802.11 standards. In certain example embodiments, the radio component, in cooperation with the communications antennas, may be configured to communicate via 2.4 GHz channels (e.g., 802.11b, 802.11g, 802.11n), 5 GHz channels (e.g., 802.11n, 802.11ac), or 60 GHz channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

Various modulation schemes and coding rates may be defined by a wireless standard, which may be represented by a Modulation and Coding Scheme (MCS) index value. MCS index values may be used to determine the likely data rate of a Wi-Fi connection during a wireless communication between two devices (e.g., between AP 102 and user device 120). The MCS value may indicate the modulation type (e.g., BPSK, QPSK, 16-QAM, 64 QAM) and the coding rates (e.g., 1/2, 2/3, 3/4, 5/6) that are possible when connecting to an access point (e.g., AP 102), where BPSK stands for binary phase shift keying, QPSK stands for quadrature phase shift keying, and QAM stands for quadrature amplitude modulation. It is understood that modulation is the method by which data is communicated through the air. The more complex the modulation, the higher the data rate. More complex modulations may require better conditions such as less interference and a good line of sight. The coding rate may be an indication of how much of a data stream is actually being used to transmit usable data. This may be expressed as a fraction with a rate 5/6 or 83.3% of the data stream being used. In some other embodiments, the rate may be 7/8 or 87.5%. The actual MCS value may depend on variables such as hardware design and local interferences that may affect the rate and the network performance during the communication. For example, if a wireless or Wi-Fi connection cannot be maintained when there are too many errors being experienced during the communication between the two devices, the MCS value may be lowered by selecting a different modulation type and/or coding rate in order to reduce the error rate. Although an MCS value may indicate the data rate of the wireless or Wi-Fi connection, it may not determine the actual throughput of the network.

In one embodiment, and with reference to FIG. 1, a symbol block (e.g., symbol block 143) may be comprised of a guard interval (e.g., guard interval 147) and 4 LDPC code words (e.g., LDPC (1) 149, LDPC (2) 150, LDPC (3) 151, and LDPC (4) 152). The guard interval may be 64 symbols in length. The 4 LDPC code words may be 448 symbols in length (each 112 symbols). Each symbol may be 6 bits in length if a 64 QAM modulation is used. The symbol block may accommodate a total of 2,688 bits, and each LDPC code word may be 672 bits in length. Accordingly 4 LDPC code words may be accommodated in the symbol block.

During communications between AP 102 and one or more user devices 120, AP 102 may generate packets 140 to be sent to one or more user devices 120. Each packet may contain one or more single carrier blocks (SC-BLKs) 143-146, each of which may contain a plurality of low density parity check (LDPC) code words encapsulated in an interleaved symbol block (e.g., Interleaved Symbol Block 148).

An access point (e.g., AP 102) may exchange data with one or more devices (e.g., user device(s) 120) using one or more channels (e.g., channel 132). The one or more LDPC codes (e.g., LDPC (1) 149, LDPC (2) 150, LDPC (3) 151, and LDPC (4) 152) may include data (e.g., streaming video requested by one or more user devices 120) transmitted from AP 102 to one or more user devices 120. The data in the one or more LDPC code words may contain data that is interleaved in such a way that the data is less likely to be corrupted by noise introduced by a transmitter (e.g., a transmitter (not shown) in transceiver 1510 of FIG. 15) at AP 102 and noise introduced by a receiver (e.g., a receiver (not shown) in transceiver 1510) at the one or more user devices 120.

In one embodiment, 64 QAM may be introduced as an additional modulation for SC over what exists in IEEE 802.11ad. For this modulation, the LDPC code rates may be: 5/8, 3/4, 13/16, or 7/8. Code rates of 13/16 and 7/8 may also be added to 16 QAM (above MCS12), where a large gap in performance between MCS12 and 64 QAM code rate 5/8 exists. Current next generation 60 GHz (NG60) and IEEE 802.11 standards do not include these MCSs and the LDPC rate 7/8 code. The 64 QAM MCSs may enable increasing the data rate of SC MCSs without needing to use schemes such as bonding or MIMO. The new QPSK and 16-QAM MCSs may improve link adaptation, as they may decrease the performance gap between MCS9 and MCS10, and between MCS12 and the lowest 64 QAM MCS.

Packet 140 may comprise a preamble (e.g., Preamble 141), a header (e.g., Header 142), and a plurality of SC-BLKs (e.g., SC-BLKs 143-146). Each SC-BLK may comprise, among other things, a guard interval (e.g., Guard Interval 147) and an interleaved symbol block (e.g., Interleaved Symbol Block 148). Interleaved Symbol Block 148 may comprise LDPC (1) 149, LDPC (2) 150, LDPC (3) 151 and LDPC (4) 152. As mentioned above, a transmitting device may attach a guard interval to an interleaved symbol block so that the receiving device may estimate the phase of the noise introduced by the transmitter and/or receiver.

Figure 2:
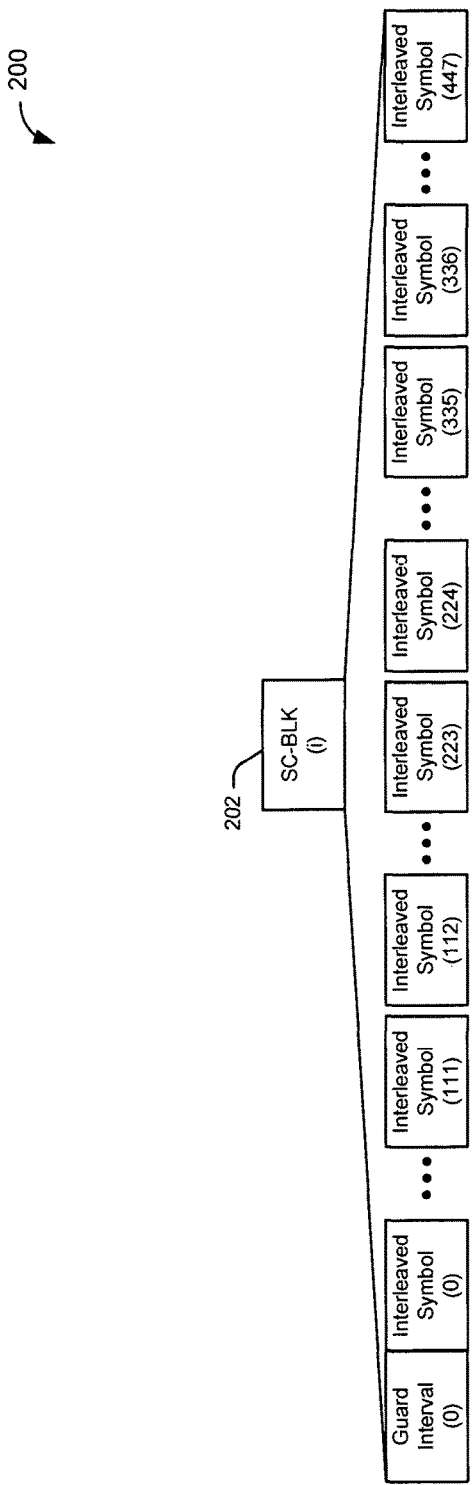
FIG. 2 depicts exemplary fields of a single carrier block (SC-BLK), in accordance with one or more example embodiments of the present disclosure.

FIG. 2 depicts exemplary fields of a single carrier block (SC-BLK), in accordance with one or more example embodiments of the disclosure. SC-BLK (i) 202 may be a single carrier block in accordance with any one of the IEEE 802.11 standards. SC-BLK (i) 202 may comprise a plurality of symbols (e.g., 448 symbols) each of which may be modulated using a single radio frequency (RF) carrier. In particular, a group of bits in each symbol, or all of the bits in the symbol, may be modulated using a single carrier RF.

Figure 3:
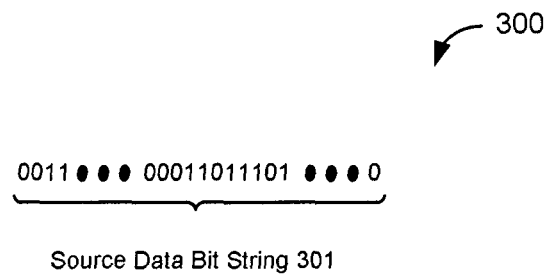
FIG. 3 depicts an exemplary source data bit string, in accordance with one or more example embodiments of the present disclosure.

FIG. 3 depicts an exemplary source data bit string, in accordance with one or more example embodiments of the present disclosure. Source Data Bit String 301 may be a plurality of bits corresponding to data generated by one or more applications stored in a memory of a transmitting device (e.g., AP 102) which may be transmitted over a channel (e.g., channel 132) using a single carrier modulation to one or more receiving devices (e.g., user device(s) 120). As an example, the bits may correspond to a digitized stream of analog data associated with a messenger service that a user (e.g., user(s) 110) may be interacting with on a smart phone (e.g., Smart Phone 126).

Figure 4:
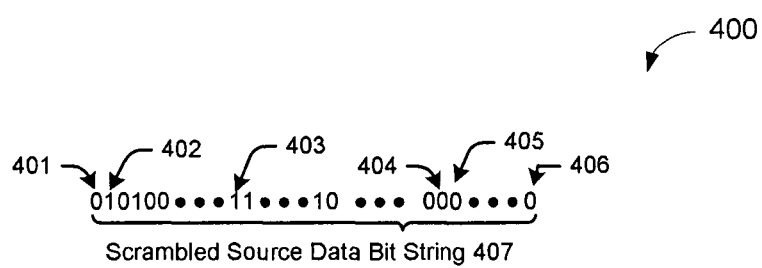
FIG. 4 depicts an exemplary scrambled source data bit string and decoding, in accordance with one or more example embodiments of the disclosure.

FIG. 4 depicts an exemplary scrambled source data bit string and decoding, in accordance with one or more example embodiments of the disclosure. Scrambled Source Data Bit String 407 may be a rearrangement of the order of the bits in Source Data Bit String 301. The bits may be rearranged by a processor in the transmitting device by applying a pseudo-random binary sequence (PRBS) to Source Data Bit String 301. The PRBS may be implemented using a linear feedback shift register (LFSR), where the LFSR may be described by a polynomial of the form $1+x^{-1}+x^{-2}+ \ldots +x^{-n}$, wherein the letter "n" may be any natural number (i.e., 0, 1, 2, ... ). Alternatively the bits may be rearranged by the processor in the transmitting device by multiplying the bits in the source data bit string by a transfer function in Z-space. The transfer function may correspond to a polynomial with the same form as the polynomial described above. Each of bits 401-406 in Scrambled Source Data Bit String 407 may correspond to the output of the LFSR or transfer function.

Figure 5:
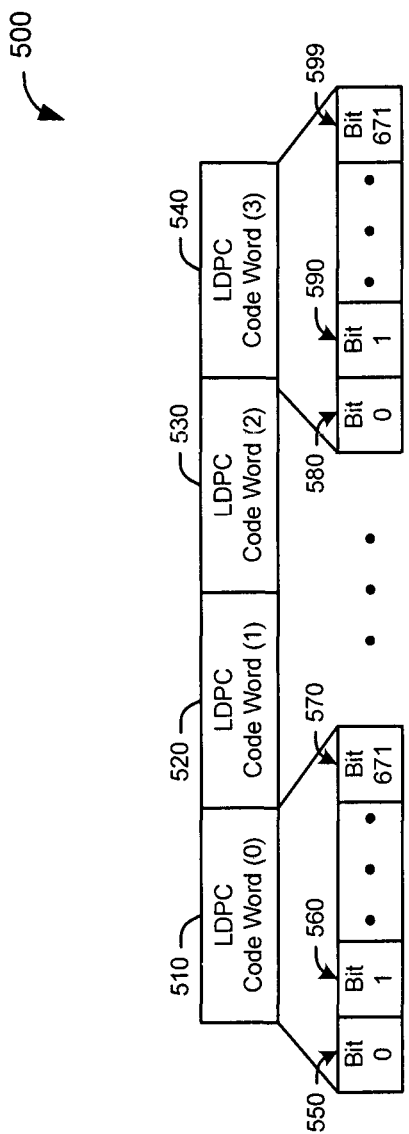
FIG. 5 depicts exemplary bit sequences of low density parity check (LDPC) code words, in accordance with one or more example embodiments of the disclosure.
Figure 6:
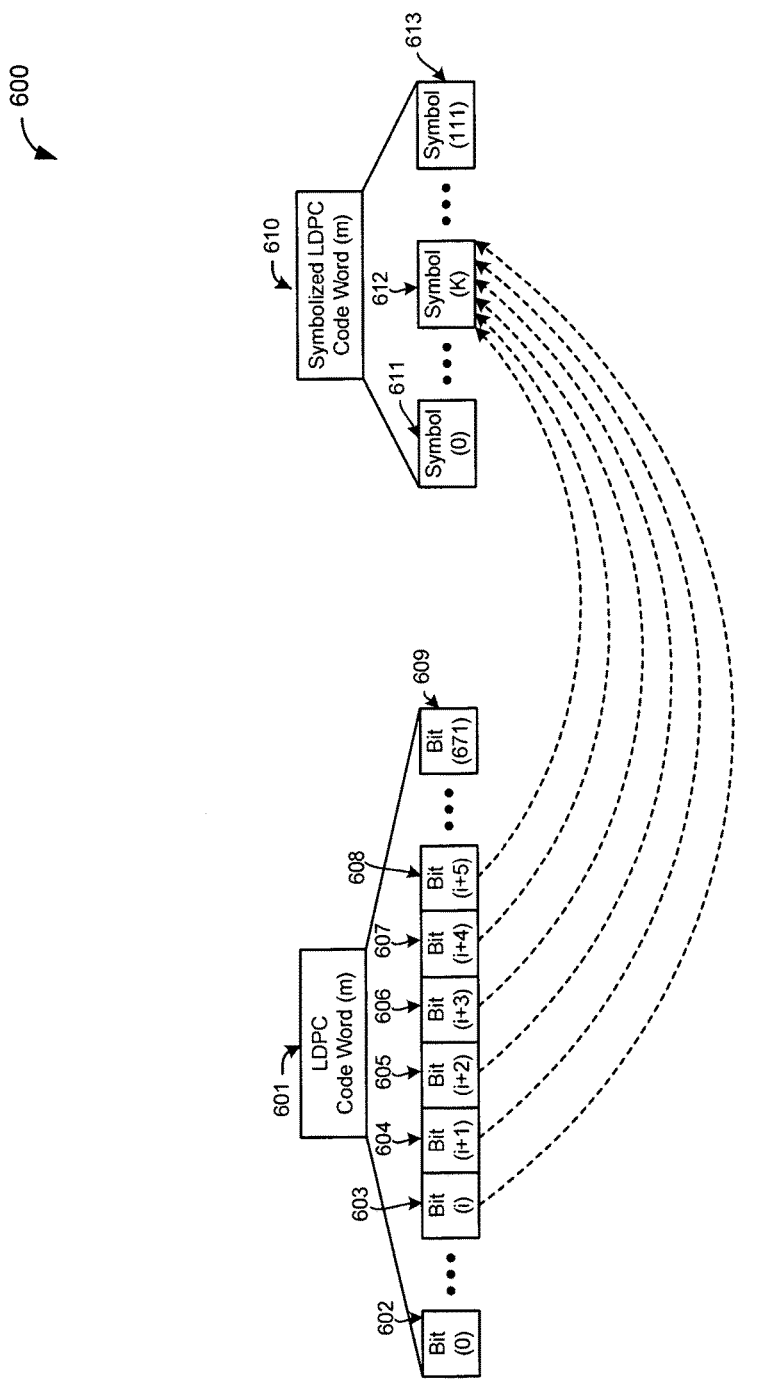
FIG. 6 depicts a mapping of bits in an LDPC code word to a modulation symbol, in accordance with one or more embodiments of the disclosure.

FIG. 5 depicts exemplary bit sequences of low density parity check (LDPC) code words, in accordance with one or more example embodiments of the disclosure. After the one or more bits in the source data bit string are rearranged into a scrambled source data bit string, segments of the scrambled source data bit string may be encoded to generate code words. For example, a first segment of bits of Scrambled Source Data Bit String 407 may be input to an LDPC encoder by the processor in the transmitting device (e.g., AP 102), and the LDPC encoder may generate a first LDPC code word (e.g., LDPC Code Word (0) 510) comprising a plurality of bits (e.g., 671 bits). A second, third, and fourth segment of the scrambled source data bit string may similarly be encoded to generate a second, third, and fourth LDPC code word (e.g., LDPC Code Words (1) 520, (2) 530, and (3) 540). Each of the bits in the LDPC code word (e.g., Bit0 550, Bit1 560, Bit671 570, Bit0 580, Bit1 590, and Bit 671 599) may be mapped to a corresponding modulation symbol (e.g., 64 QAM symbol). For example, FIG. 6 depicts a mapping of bits in an LDPC code word to a modulation symbol, in accordance with one or more embodiments of the disclosure. The number of bits mapped from an LDPC code word to a modulation symbol may be based upon a constellation size (e.g., 64) of the modulation scheme (e.g., QAM). For example, in FIG. 6, the transmitting device may modulate six bits (Bits (i) 603-608) to a single symbol (Symbol (k) 612) because the constellation size of the modulation scheme is $64=2^6$. In this example, the number 6 may be referred to as the symbol size, and the number 64 may be referred to as the constellation size. The constellation size may be used to determine the symbol size, or the symbol size may be used to determine the constellation size in accordance with the expression $M=2^r$, wherein the letter "r" may be the symbol size and the letter "M" may be the constellation size. LDPC Code Word (m) 601 may comprise a plurality of bits (e.g., 671 bits) and may correspond to any of LDPC Code Word (0) 510-LDPC Code Word (3) 540. Bit(0) 602 and Bit(671) 609 may be mapped to Symbol (0) 611 and Symbol (111) 613 respectively.

Symbolized LDPC Code Word (m) 610 may comprise a plurality (e.g., 112) of symbols (e.g., Symbol (0) 611-Symbol (111) 613). Each of Symbolized LDPC Code Word (m) 610, for m=0, 1, 2, 3 may comprise modulated symbols corresponding to each of LDPC Code Word (0) 510-LDPC Code Word (3) 540 respectively. Once the bits of the LDPC code words have been mapped to modulation symbols for each of the LDPC code words, each modulation symbol in a symbolized LDPC code word may be interleaved by an interleaver wherein a symbol in the $K^{th}$ position of a symbolized LDPC code word may be mapped to the $n^{th}$ position of an interleaved symbolized LDPC code word.

Figure 7:
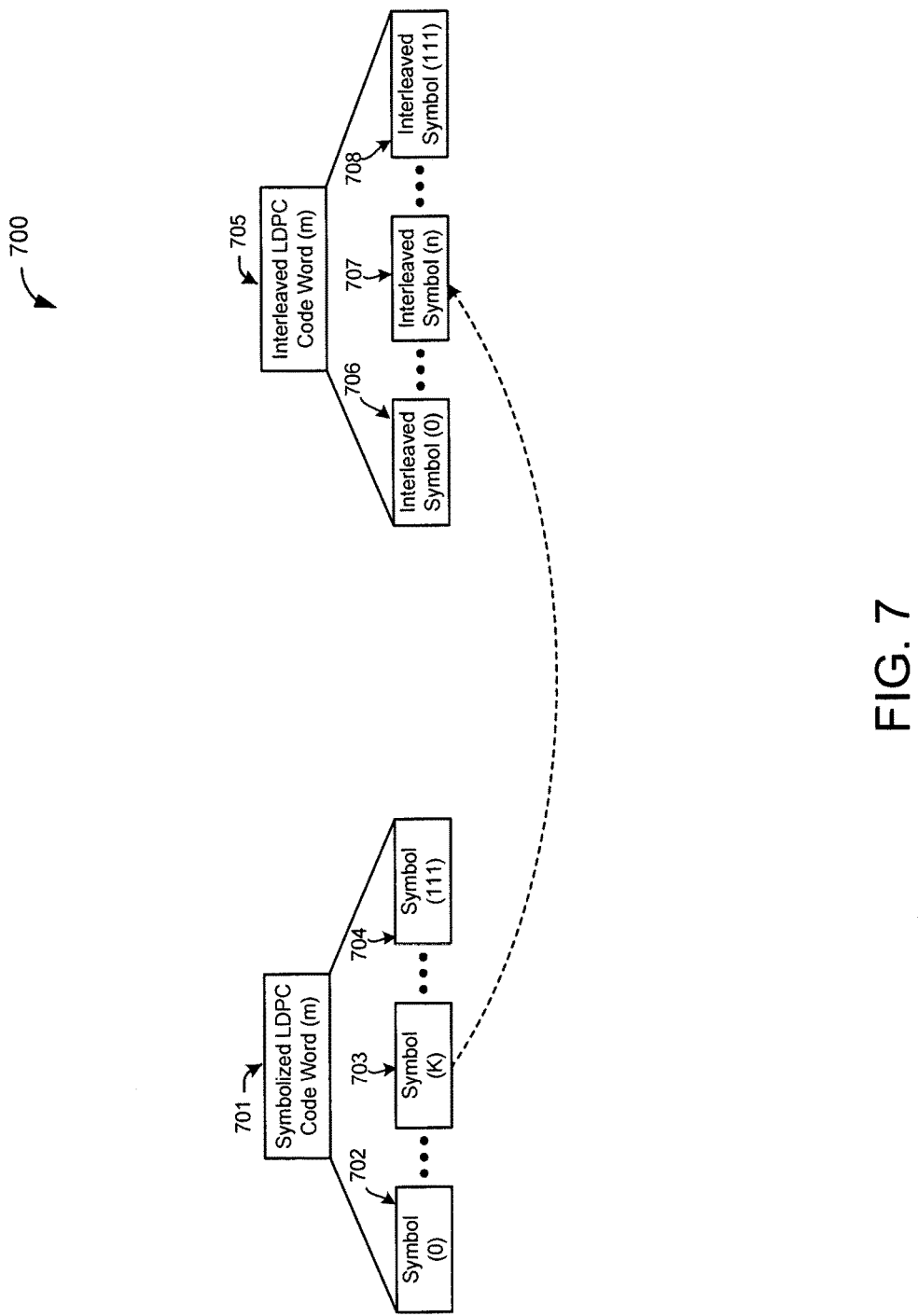
FIG. 7 depicts a mapping of a modulation symbol to an interleaved LDPC code word symbol, in accordance with one or more embodiments of the disclosure.

FIG. 7 depicts the mapping of a modulation symbol to an interleaved LDPC code word symbol, and may be representative of the mapping of the modulation symbols of all of the symbolized LDPC code words (e.g., Symbolized LDPC Code Word (m) 701, for m=0, 1, 2, and 3) to interleaved LDPC code words (e.g., Interleaved LDPC Code Word (m) 705, for m=0, 1, 2, and 3). Symbolized LDPC Code Word (m) 701 may comprise a plurality of symbols (e.g., 112) wherein there is a first symbol (e.g., Symbol (0) 702) and a last symbol (e.g., Symbol (111) 704). Interleaved LDPC Code Word (m) 705 may comprise a plurality of interleaved symbols (e.g., 112) wherein there is a first symbol (e.g., Interleaved Symbol (0) 706) and a last symbol (e.g., Interleaved Symbol (111) 708).

The interleaver may map the symbol in the $K^{th}$ position of a symbolized LDPC code word to the $n^{th}$ position of the interleaved symbolized LDPC code word based at least in part on the interleaver expression $$n = 4 \times \left\lfloor \frac{K}{r} \right\rfloor + m \times r + K \oplus r.$$

The letter "n" may correspond to the nth position in the interleaved symbolized LDPC code word, and the letter "K" may correspond to the $K^{th}$ position of the symbolized LDPC code word. The letter "r" may correspond to the group size, and the letter "m" may correspond to the code word that is being interleaved. The group size may be equal to $2^j$ where j=1, 2, 3, and so forth. The group size may be determined based at least in part on a network administrator and/or an access point. The group size may be based, at least in part, on one or more network metrics including, but not limited to, bandwidth consumed, traffic patterns (e.g., statistical analysis of the size of the frames sent between the user devices and access point) that may affect bandwidth consumed by the user devices and access point, contention for access to a channel used by the user devices and access point to communicate, and so forth. The expression $$\left\lfloor \frac{K}{r} \right\rfloor$$

may be a floor function applied to the ratio of an integer value corresponding to the $K^{th}$ position of a symbol in the mth symbolized LDPC code word and an integer value corresponding to group size. The floor function may round the resulting number of the ratio to the closest integer value if the resulting number is not an integer. As an example, 16 symbols (not the first 16) in an interleaved LDPC code word (Interleaved LDPC Code Word (m) 705) may correspond to the first 16 symbols (e.g., Symbol (0) 702-Symbol (K) 703, where K=15) of a symbolized LDPC code word (e.g., Symbolized LDPC Code Word (m) 701). Each of the first 16 symbols of the symbolized LDPC code word may be assigned corresponding integer values 0-15. A processor in a transmitting device may divide the integer value 0, corresponding to a symbol in the first position of a second symbolized LDPC code word (e.g., Symbolized LDPC Code Word (1)), by 16 and the processor may calculate a resulting integer value of 0. The floor function may not be applied to the resulting integer because it is already an integer. When the processor divides the integers 1-15, each of which corresponds to the $2^{nd}$-$16^{th}$ positions in the second symbolized LDPC code word, the resulting numbers will be strictly greater than zero and strictly less than one (i.e., a fraction with a positive numerator and denominator, wherein the numerator is less than the denominator). The processor may apply the floor function to each of the resulting numbers because the resulting numbers are not integers. Accordingly, the processor may round the resulting number down to zero as a result of applying the floor function. The processor may round the resulting number down to zero because the closest integer value that the processor can round any fraction strictly greater than zero and strictly less than one is zero.

The expression K⊕r may correspond to the application of a modulus operation to the integer value corresponding to the $K^{th}$ position in the $m^{th}$ symbolized LDPC code word and the group size (i.e., r). The modulus operation is the remainder of the division of the integer value corresponding to the $K^{th}$ position of the $m^{th}$ symbolized LDPC code word and the group size. Returning to the example above, the integer values corresponding to the first 16 positions of the second LDPC code word are 0-15, and the processor may divide each integer value by a group size of r=16. After the processor computes the resulting integer value corresponding to the application of the floor function to the ratio of the integer value corresponding to the $K^{th}$ position in the $2^{nd}$ symbolized LDPC code word and the group size (this may be referred to as integer value a), and applies the modulus operation to the integer value corresponding to the $K^{th}$ position in the $2^{nd}$ symbolized LDPC code word and the group size (this may be referred to as integer value b), the processor may compute, using integer value a and integer value b, the integer value corresponding to the position of the interleaved LDPC code word that the symbols are mapped to.

In particular, the processor may compute the product of four times the group size and integer value a (this may be referred to as integer value c). The processor may also compute the product of the integer value corresponding to the $m^{th}$ code word and the group size, and may add the computed result to integer value b (this may be referred to as integer value d). The processor may compute the addition of integer values c and d, and the corresponding integer value may correspond to the position in the interleaved LDPC code word to which a symbol in the symbolized LDPC code word is mapped. For example, returning to the example above, the processor may determine that the symbol in the $1^{st}$ position of the $2^{nd}$ symbolized LDPC code word may be mapped to the $32^{nd}$ position of the $2^{nd}$ interleaved LDPC code word by computing the addition of integer values c and d (i.e., the addition of $4 \times 16 \times \lfloor 0/16 \rfloor = 4 \times 16 \times 0 = 0$ and $2 \times 16 + 0 \oplus 16$). The $1^{st}$ position in the symbolized LDPC code word and interleaved LDPC code word corresponds to an integer value of 0 as explained above. Accordingly the symbols in the $2^{nd}$-$16^{th}$ positions of the second symbolized LDPC code word may be mapped to the $33^{rd}$-$47^{th}$ positions of the second interleaved LDPC code word respectively. The same process may be applied to all symbolized LDPC code words (e.g., Symbolized LDPC Code Word (0)-Symbolized LDPC Code Word (3)) and interleaved LDPC code words (e.g., Interleaved LDPC Code Word (0)-Interleaved LDPC Code Word (3)).

Figure 8:
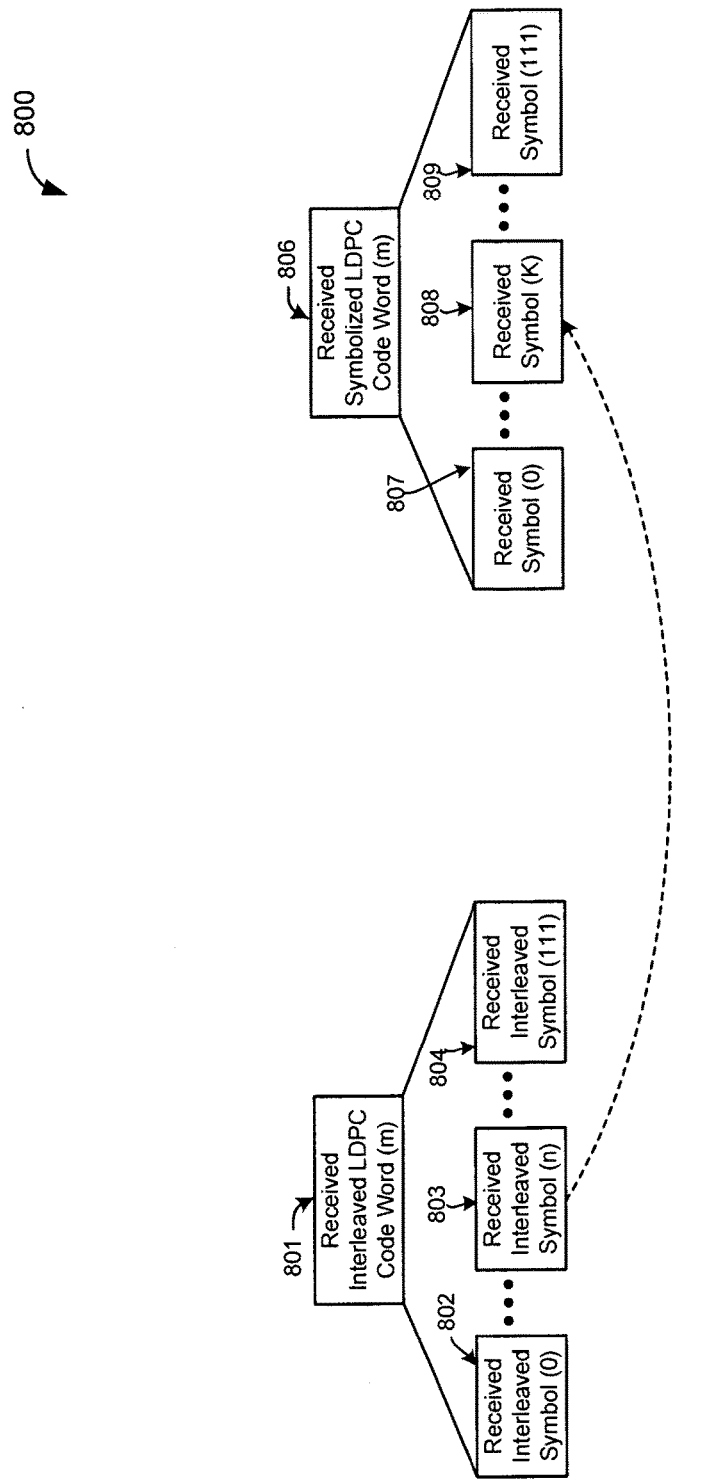
FIG. 8 depicts a mapping of a received LDPC code word symbol to a modulation symbol, in accordance with one or more embodiments of the disclosure.

After the symbolized LDPC code words have been interleaved, the interleaved LDPC code words may be transmitted by a transmitting device (e.g., AP 102) to one or more receiving devices (e.g., user device(s) 120) in a packet (e.g., packet 140). When the receiving device receives the packet, a processor on the receiving device may deinterleave the interleaved LDPC code words received in the packet. FIG. 8 depicts a mapping of a received LDPC code word symbol to a modulation symbol, in accordance with one or more embodiments of the disclosure. The processor may map the symbols in a received Interleaved LDPC code word (e.g., Received Interleaved LDPC Code Word (m) 801) to a received symbolized LDPC code word (e.g., Received Symbolized LDPC Code Word (m) 806) by applying the following deinterleaver expression $$m = \left\lfloor \frac{n}{r} \right\rfloor \oplus 4 \text{ wherein } k = n \oplus r + r \times \left\lfloor \frac{n}{4r} \right\rfloor.$$

Returning to the example above, the symbols in the $32^{nd}$-$47^{th}$ positions of the received Interleaved LDPC code word may be mapped to the $0^{th}$-$15^{th}$ positions of the received symbolized LDPC code word. For example, the symbol in the $n = 32^{nd}$ position of the second received Interleaved LDPC code word may be mapped to the $m = \lfloor 32/16 \rfloor \oplus 4 = 2 \oplus 4 = 2^{nd}$ received symbolized LDPC code word and the $$k = 32 \oplus 16 + 16 \times \left\lfloor \frac{32}{4 \times 16} \right\rfloor = 32 \oplus 16 + 16 \times \left\lfloor \frac{32}{64} \right\rfloor = 0^{th}$$

position in the $2^{nd}$ received symbolized LDPC code word. Similarly, the symbols in the $33^{rd}$-$47^{th}$ position of the second received Interleaved LDPC code word may be mapped to the $2^{nd}$-$15^{th}$ received symbolized LDPC code word. Received Interleaved Symbol (0) 802 and Received Interleaved Symbol (111) 804 may also be mapped to a position (not shown) in Received Symbolized LDPC Code Word (m) 806. Received Symbol (0) 807 and Received Symbol (111) 809 may correspond to positions in Received Symbolized LDPC Code Word (m) 806 that a received interleaved symbol (not shown) in Received Interleaved LDPC Code Word (m) 801 may be mapped to.

Figure 9:
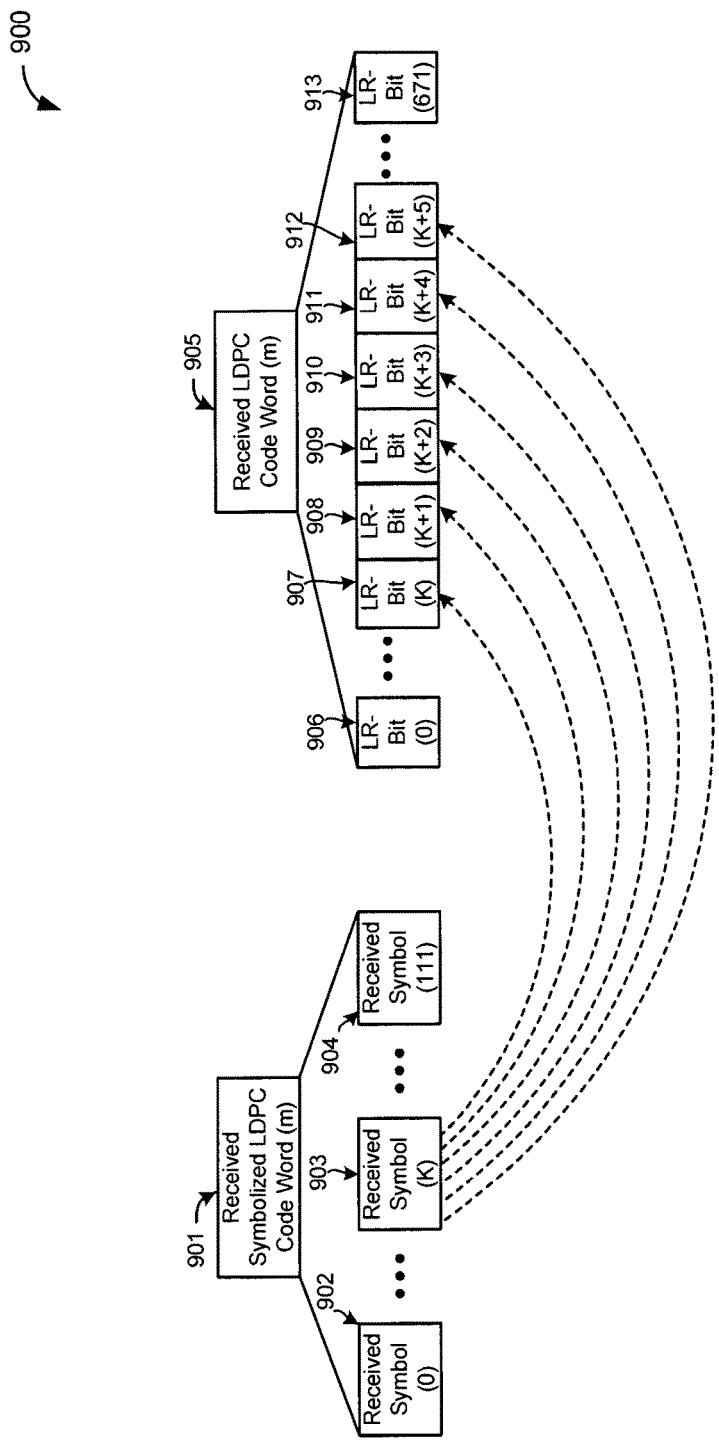
FIG. 9 depicts a mapping of a modulation symbol to bits in an LDPC code word, in accordance with one or more embodiments of the disclosure.
Figure 10:
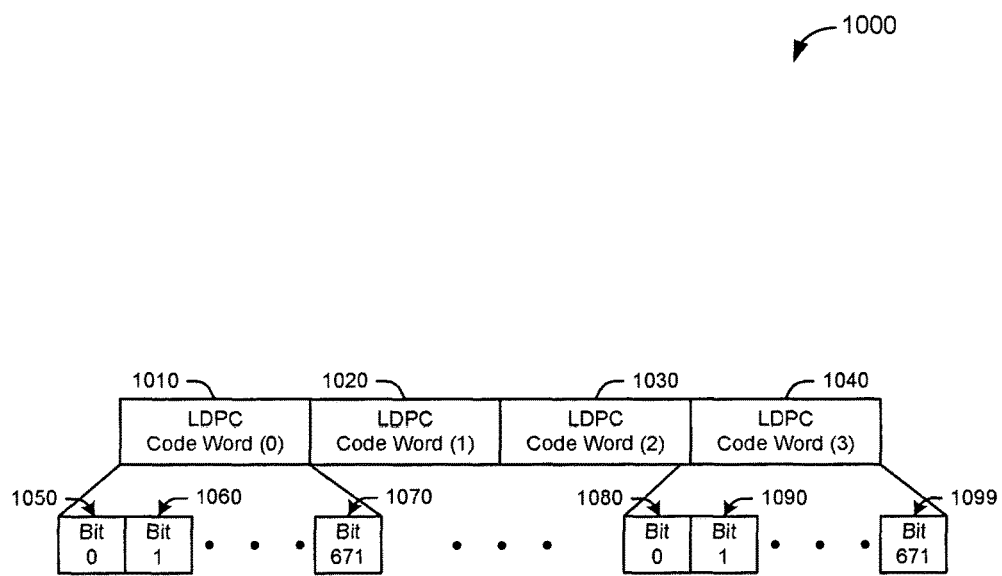
FIG. 10 depicts concatenated LDPC code words forming an interleaved symbol block, in accordance with one or more embodiments of the disclosure.

After the receiving device processor deinterleaves each received Interleaved LDPC code word (e.g., Received Interleaved LDPC Code Word (0)-Received Interleaved LDPC Code Word (3)) into a corresponding received symbolized LDPC code word (e.g., Received Symbolized LDPC Code Word (0)-Received Symbolized LDPC Code Word (3)), the processor may demap (i.e., map the modulated bits in each Received Symbol (K) 903 to corresponding likelihood ratio bits). For example, FIG. 9 depicts a mapping of a modulation symbol to bits in an LDPC code word. Received Symbol (K) 903 in Received Symbolized LDPC Code Word (m) 901 may comprise 6 bits that may be mapped to likelihood ratio bits (LR-Bit (K) 907-912). The processor may demap each of the bits in each of Received Symbol (0) 902-Received Symbol (111) 904 to one of likelihood ratio bits LR-Bit (0) 906-LR-Bit (671) 913 in Received LDPC Code Word (m) 905 for each m=0, 1, 2, and 3. The likelihood ratio bits may then be grouped together into LDPC code words as depicted in FIG. 10. FIG. 10 depicts concatenated LDPC code words forming an interleaved symbol block (not shown), in accordance with one or more embodiments of the disclosure. The likelihood ratio bits in each of the LDPC code words (e.g., LDPC Code Word (0) 1010-LDPC Code Word (3) 1040) may correspond to a scrambled source data bit string (e.g., Received Scrambled Source Data Bit String 1107 (FIG. 11)) transmitted by the transmitting device (e.g., AP 102). LDPC Code Word (0) 1010-LDPC Code Word (3) 1040 may comprise 671 bits. For example, LDPC Code Word (0) 1010 may comprise 671 bits (e.g., Bit0 1050, Bit1 1060, . . . , Bit671 1070), and LDPC Code Word (3) 1040 may comprise 671 bits (e.g., Bit0 1080, Bit1 1090, . . . , Bit671 1099). Bit0 1050 and Bit0 1080 may correspond to the first bit in LDPC Code Word (0) 1010 and LDPC Code Word (3) 1040 respectively, Bit1 1060 and Bit1 1090 may correspond to the second bit in LDPC Code Word (0) 1010 and LDPC Code Word (3) 1040 respectively, and Bit671 1070 and Bit671 1099 may correspond to the first bit in LDPC Code Word (0) 1010 and LDPC Code Word (3) 1040 respectively. The other 688 bits in LDPC Code Word (0) 1010 and LDPC Code Word (3) 1040 are not depicted in FIG. 10.

The processor may determine the likelihood ratio bits (i.e., LR-Bit (K) 907-LR-Bit (K+5) 912) corresponding to the received symbol (i.e., Received Symbol (K) 903) in a code word (i.e., Received LDPC Code Word (m) 905) by finding a bit string (e.g., b*) and a symbol (e.g., x*) corresponding to the bit string in a constellation of symbols associated with the modulation scheme (e.g., 64 QAM) used to demodulate the received interleaved symbol (i.e., Received Interleaved Symbol (n) 803). The symbol x* may be a symbol that is closest to the received symbol (i.e., Received Symbol (K) 808) in the number of bits that are common between x* and the received symbol. For example, if the received symbol comprises bit string 100110, the processor may determine that the closest symbol to the received symbol is 100011 as opposed to 111111. Accordingly, the processor may assign the bit string 10001to x*. The bit string b* may correspond to coded LDPC bits in an LDPC code word. The processor may determine a subset of all bit strings associated with the modulation scheme that includes a specific value at a particular bit position in the bit string, in order to narrow the search performed by the processor to locate a bit string that most likely corresponds to the bit string that was sent from the transmitting processor. In other words, the processor may select a bit string from the subset and determine the Euclidian distance between the received bit string and the bit string in the subset to calculate the likelihood of the received bit string being equal to the bit string in the subset. The likelihood may be expressed as a percentage value, and if it is above a predetermined percentage value, the processor may determine that the bit string in the subset corresponds to the bit string transmitted by a transmitting processor. The subset may contain a plurality of bit strings. For example, there may be 32 different bit strings that include a zero at a particular bit position of the bit string and 32 different bit strings that include a one at a particular bit position of the bit string. Each of these 32 bit strings may correspond to a subset of all the bit strings associated with a 64 QAM modulation scheme. For instance, there are 32 different bit strings that include a zero in the least significant (i.e., right most) position of the bit string. The remaining five positions to the left of the least significant position are not fixed and may be equal to zero or one. Consequently, the number of permutations of one and zero that may be assigned to the remaining five positions is equal to $2^5=32$, and the number of permutations of the assignments of one and zero to the remaining five positions along with the zero in the least significant position correspond to a subset of bit strings associated with symbols corresponding to the 64 QAM modulation scheme. The processor may select a bit string from a subset wherein the Euclidian distance between the bit string in the subset and the received bit string is minimized. The bit string in the subset that minimizes the distance may be assigned to the likelihood ratio bits (e.g., LR-Bit (K) 907-LR-Bit (K+5) 912) in the received LDPC code word.

Figure 11:
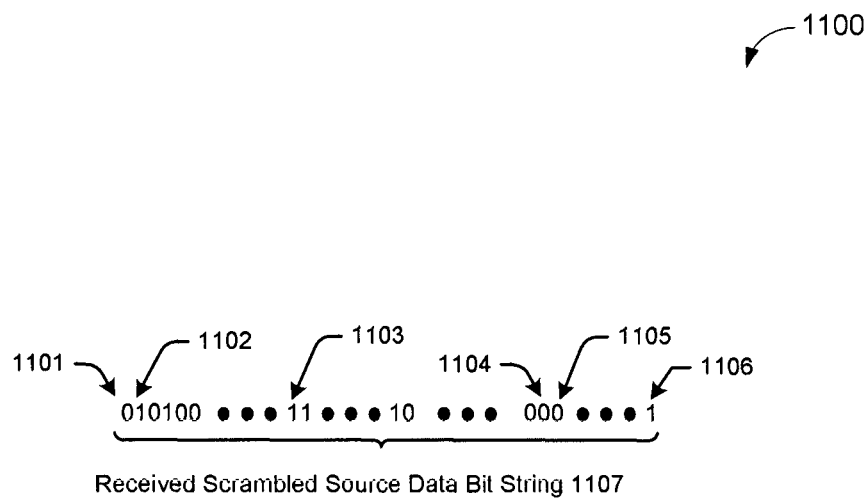
FIG. 11 depicts a received scrambled source data bit string, in accordance with one or more embodiments of the disclosure.

FIG. 11 depicts a received scrambled source data bit string, in accordance with one or more embodiments of the disclosure. In some embodiments, Received Scrambled Source Data Bit String 1107 may be equivalent but not exactly equal to Scrambled Source Data Bit String 407. As an example, bits 1101-1105 of Received Scrambled Source Data Bit String 1107 may be in exactly the same position and may be equal to bits 401-405 in Scrambled Source Data Bit String 407, but bit 1106 of received Scrambled Source Data Bit String 1107 may not be the same as bit 406 in Scrambled Source Data Bit String 407.

Figure 12:
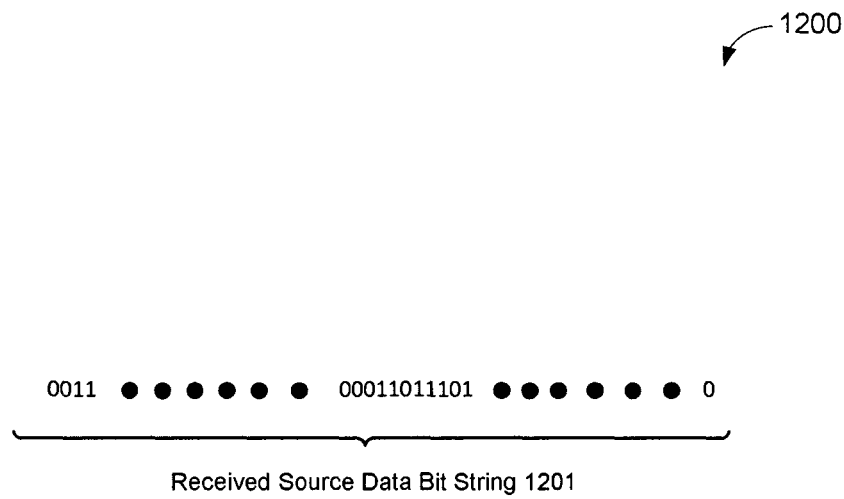
FIG. 12 depicts a received source data bit string, in accordance with one or more embodiments of the disclosure.

The received scrambled source data bit string may be descrambled by applying the same polynomial above that was used to scramble the source data bit string. In some embodiments, the received scrambled source data bit string may be provided as input to an LFSR to generate the received source data bit string, and in other embodiments the received scrambled source data bit string may be provided as input to a transfer function to generate the received source data bit string. FIG. 12 depicts a received source data bit string, in accordance with one or more embodiments of the disclosure. Received Source Data Bit String 1201 may correspond to Source Data Bit String 301.

Figure 13:
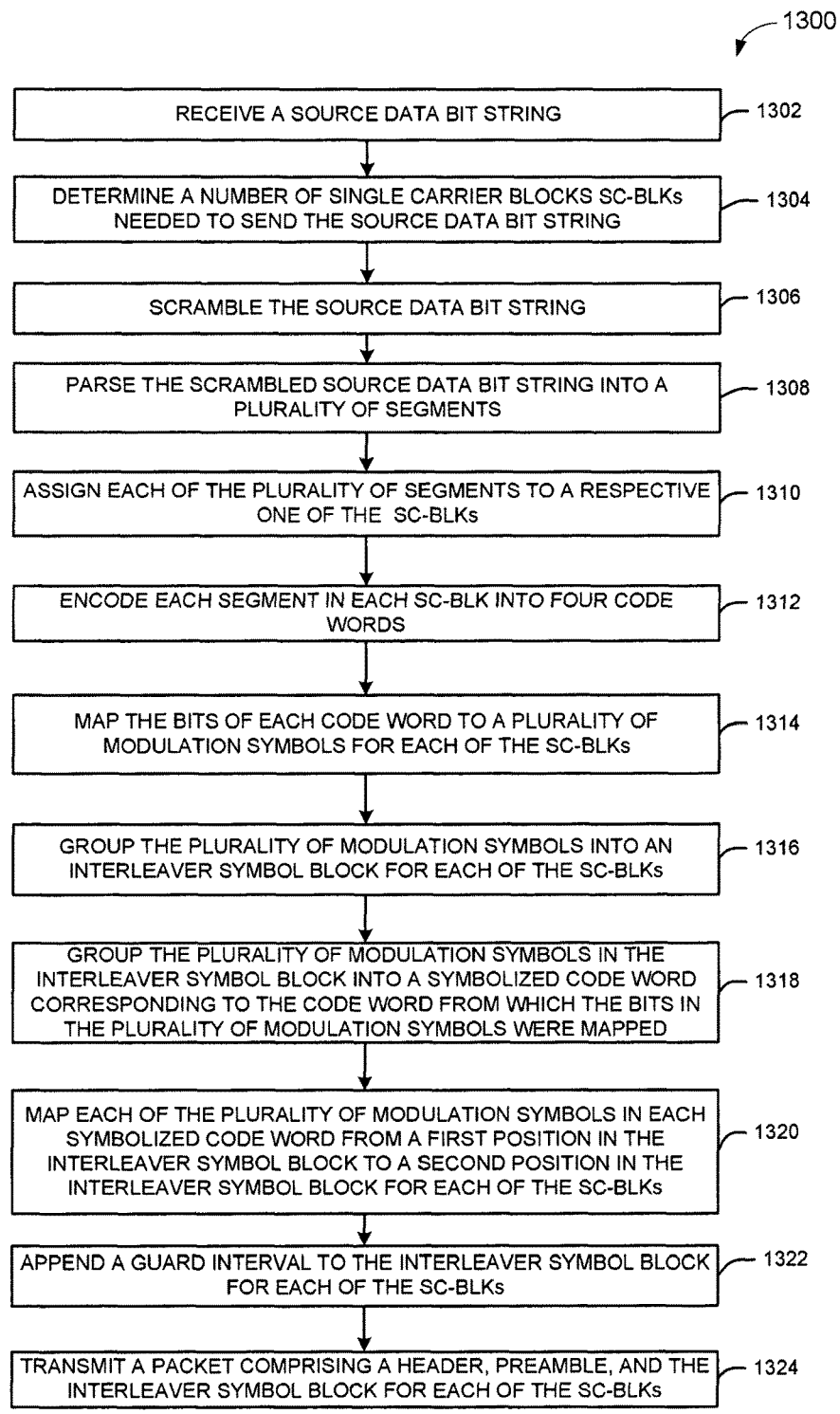
FIG. 13 depicts a flow diagram of an illustrative process for interleaving modulation symbols, in accordance with one or more embodiments of the disclosure.

FIG. 13 depicts a flow diagram of an illustrative process 1300 for interleaving modulation symbols, in accordance with one or more embodiments of the disclosure. In block 1302, a receiving processor in a receiving device (e.g., one of the user device(s) 120) may receive a source data bit string from a transmitting processor in a transmitting device (e.g., AP 102). As explained above, the source data bit string may correspond to the stream of bits generated by one or more applications stored in memory and executed by the transmitting processor. The receiving processor may determine a number of SC-BLKs that may be needed to send the source data bit string to the receiving processor in block 1304. The source data bit string may span the length of two SC-BLKs, so the transmitting processor may determine that two SC-BLKs are needed to transmit the source data bit string. After the transmitting processor determines the number of SC-BLKs needed to transmit the source data bit string, the transmitting processor may scramble the source data bit string as explained above (block 1306). In block 1308, the transmitting processor may parse the scrambled source data bit string into a plurality of segments, and assign each of the plurality of segments to one of the SC-BLKs in block 1310. Each segment may then be encoded into four code words (e.g., LDPC Code Word (0)-LDPC Code Word (3)) by the transmitting processor in block 1312, and the bits in each code word may be mapped to a plurality of modulation symbols for each of the SC-BLKs in block 1314. The transmitting processor may then group the plurality of modulation symbols into an interleaved symbol block for each of the SC-BLKs in block 1316. After grouping the plurality of modulation symbols into the interleaved symbol block, the transmitting processor may group the modulation symbols in the interleaved symbol block into a symbolized code word corresponding to the code word from which the bits in the plurality of modulation symbols were mapped from (block 1318). For example, the transmitting processor may map Bit (i) 603-Bit (i+5) 608 into Symbol (K) 612, and Symbol (K) 612 may be grouped into Symbolized LDPC Code Word (m) 610 which may be the symbolized LDPC code word (LDPC Code Word (m) 601). In block 1320, the transmitting processor may map each modulation symbol in each symbolized code word from a first position in the interleaved symbol block (e.g., Symbol (k) 703 in Symbolized LDPC Code Word (m) 701) to a second position in the interleaved symbol block (e.g., Interleaved Symbol (n) 707 in Interleaved LDPC Code Word (m) 705) for each of the SC-BLKs. The transmitting processor may map each symbolized code word from a first position in the interleaved symbol block to a second position in the interleaved symbol block by applying the interleaver expression described above. In block 1322, the transmitting processor may add a guard interval (e.g., Guard Interval 147) to the interleaved symbol block (e.g., Interleaved Symbol Block 148), and at block 1324 may transmit a packet comprising a preamble (e.g., Preamble 141), a header (e.g., Header 142), and SC-BLKs each of which comprise a guard interval (e.g., Guard Interval 147) and the interleaved symbol block (e.g., Interleaved Symbol Block 148) to the receiving processor. The receiving processor may implement blocks 1302-1324 for each SC-BLK (e.g., for each SC-BLK 143-146).

Figure 14:
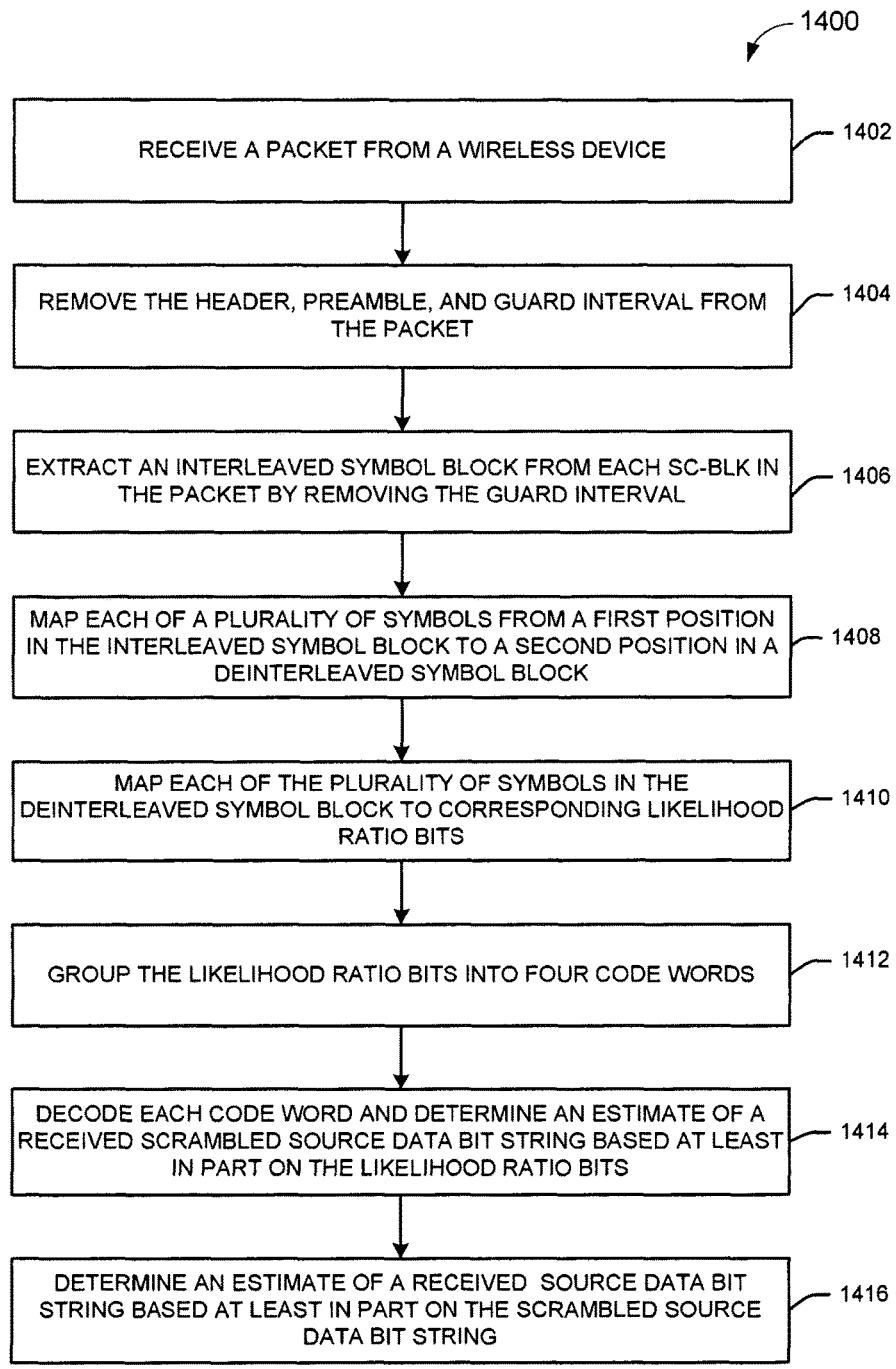
FIG. 14 depicts a flow diagram of an illustrative process for deinterleaving symbols, in accordance with one or more embodiments of the disclosure.

The receiving processor may perform a process similar to the process illustrated in FIG. 13, by deinterleaving the received symbols. FIG. 14 depicts a flow diagram of an illustrative process that may be performed by the receiving processor for deinterleaving symbols, in accordance with one or more embodiments of the disclosure. In block 1402, the receiving processor (e.g., a processor in one of the user device(s) 120) may receive the packet from the transmitting wireless device (e.g., AP 102) and may remove the header, the preamble, and the guard interval from the packet in block 1404. After removing the control fields (i.e., the header and preamble) and the guard interval, the receiving processor may extract a received interleaved symbol block from each SC-BLK in the packet by removing the guard interval (block 1406). In block 1408, the receiving processor may map each symbol in the received interleaved symbol block from a first position (e.g., Received Interleaved Symbol (n) 803) to a second position (e.g., Received Symbol (K) 808) in the received deinterleaved symbol block. The second position (e.g., Received Symbol (K) 808) in the received deinterleaved symbol block may correspond to the first position (e.g., Symbol (K) 703) of the interleaved symbol block transmitted by the transmitting processor. The receiving processor may deinterleave the symbols from the first position to the second position by applying the deinterleaver expression above. In block 1410, the receiving processor may then map each of the symbols in the deinterleaved symbol block (e.g., Received Symbol (K) 903) to corresponding likelihood ratio bits (e.g., LR-Bit (K) 907-LR-Bit (K+5) 912). The processor may select a bit string from a subset of all possible bit strings corresponding to a modulation scheme (e.g., 64 QAM) and assign a bit string from the subset to the likelihood ratio bits by selecting the bit string that minimizes the Euclidian distance between the selected bit string and the bit string corresponding to the symbols in the interleaved symbol block. The symbols in the received interleaved symbol block may correspond to modulation symbols associated with a 64 QAM modulation scheme. For instance, each symbol may correspond to a point in the 64 QAM constellation.

In some embodiments, blocks 1408 and 1410 may be interchanged. The receiving processor may map each of the plurality of symbols in the interleaved symbol block to the corresponding likelihood ratio bits (i.e., demodulate a received symbol to six likelihood ratio bits), then group each of the six likelihood ratio bits into symbols, and map each of the symbols from a first position in the interleaved symbol block to a second position in the interleaved symbol block.

The receiving processor may then group the likelihood ratio bits into four code words (e.g., LDPC Code Word (0) 1010-LDPC Code Word (3) 1040) in block 1412. In block 1414, the receiving processor may decode each LDPC code word and estimate a received scrambled source data bit string (e.g., Received Scrambled Source Data Bit String 1107) based at least in part on the likelihood ratio bits in each of LDPC Code Word (0) 1010-LDPC Code Word (3) 1040 in block 1414. In block 1416, the receiving processor may determine an estimate of a received source data bit string based at least in part on the scrambled source data bit string. The estimate may also be based on the LFSR or transfer function used to generate the scrambled source data bit string. The receiving processor may apply the LFSR or transfer function to the received scrambled source data bit string to estimate the received source data bit string. By interleaving and deinterleaving the symbols, the received source data bit string may be exactly equal to the source data bit string.

Figure 15:
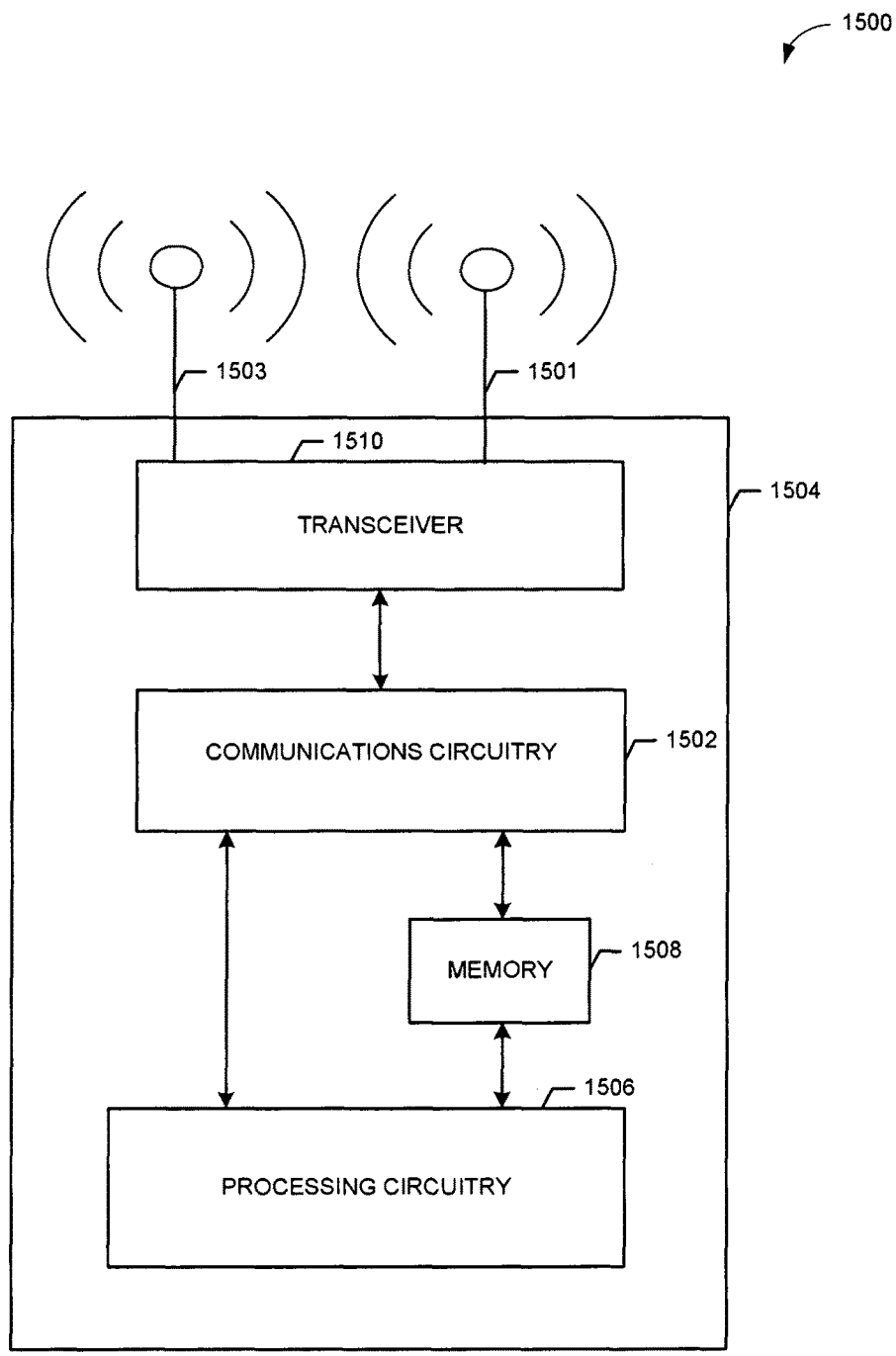
FIG. 15 depicts a block diagram of an example device capable of emitting and receiving wireless signals, in accordance with one or more embodiments of the disclosure.

FIG. 15 depicts a block diagram of an example device capable of emitting and receiving wireless signals, in accordance with one or more embodiments of the disclosure. The communication station 1500 may include communications circuitry 1502 and a transceiver 1510 for transmitting and receiving signals to and from other communication stations using one or more antennas 1501 and 1503. The communications circuitry 1502 may include circuitry that can operate the physical layer communications and/or medium access control (MAC) communications for controlling access to the wireless medium, and/or any other communications layers for transmitting and receiving signals. The communication station 1500 may also include processing circuitry 1506 and memory 1508 arranged to perform the operations described herein. In some embodiments, the communications circuitry 1502 and the processing circuitry 1506 may be configured to perform the operations detailed in FIGS. 13-14.

In accordance with some embodiments, the communications circuitry 1502 may be arranged to contend for a wireless medium and configure frames or packets for communicating over the wireless medium. The communications circuitry 1502 may be arranged to transmit and receive signals. The communications circuitry 1502 may also include circuitry for modulation/demodulation, upconversion/downconversion, filtering, amplification, etc. In some embodiments, the processing circuitry 1506 of the communication station 1500 may include one or more processors. In other embodiments, two or more antennas 1501 and 1503 may be coupled to the communications circuitry 1502 arranged for sending and receiving signals. The memory 1508 may store information for configuring the processing circuitry 1506 to perform operations for configuring and transmitting message frames and performing the various operations described herein. The memory 1508 may include any type of memory, including non-transitory memory, for storing information in a form readable by a machine (e.g., a computer). For example, the memory 1508 may include a computer-readable storage device, read-only memory (ROM), random-access memory (RAM), magnetic disk storage media, optical storage media, flash-memory devices and other storage devices and media.

In some embodiments, the communication station 1500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1500 may include one or more antennas 1501, 1503. The antennas 1501, 1503 may include one or more directional or omni-directional antennas including, for example, dipole antennas, monopole antennas, patch antennas, loop antennas, microstrip antennas, phased array antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1500 may include one or more of a keyboard, a display, a non-volatile memory port, multiple antennas, a graphics processor, an application processor, speakers, and other mobile device elements. The display may be an LCD screen including a touch screen.

Although the communication station 1500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1500 may include one or more processors and may be configured with instructions stored on a computer-readable storage device memory.

Figure 16:
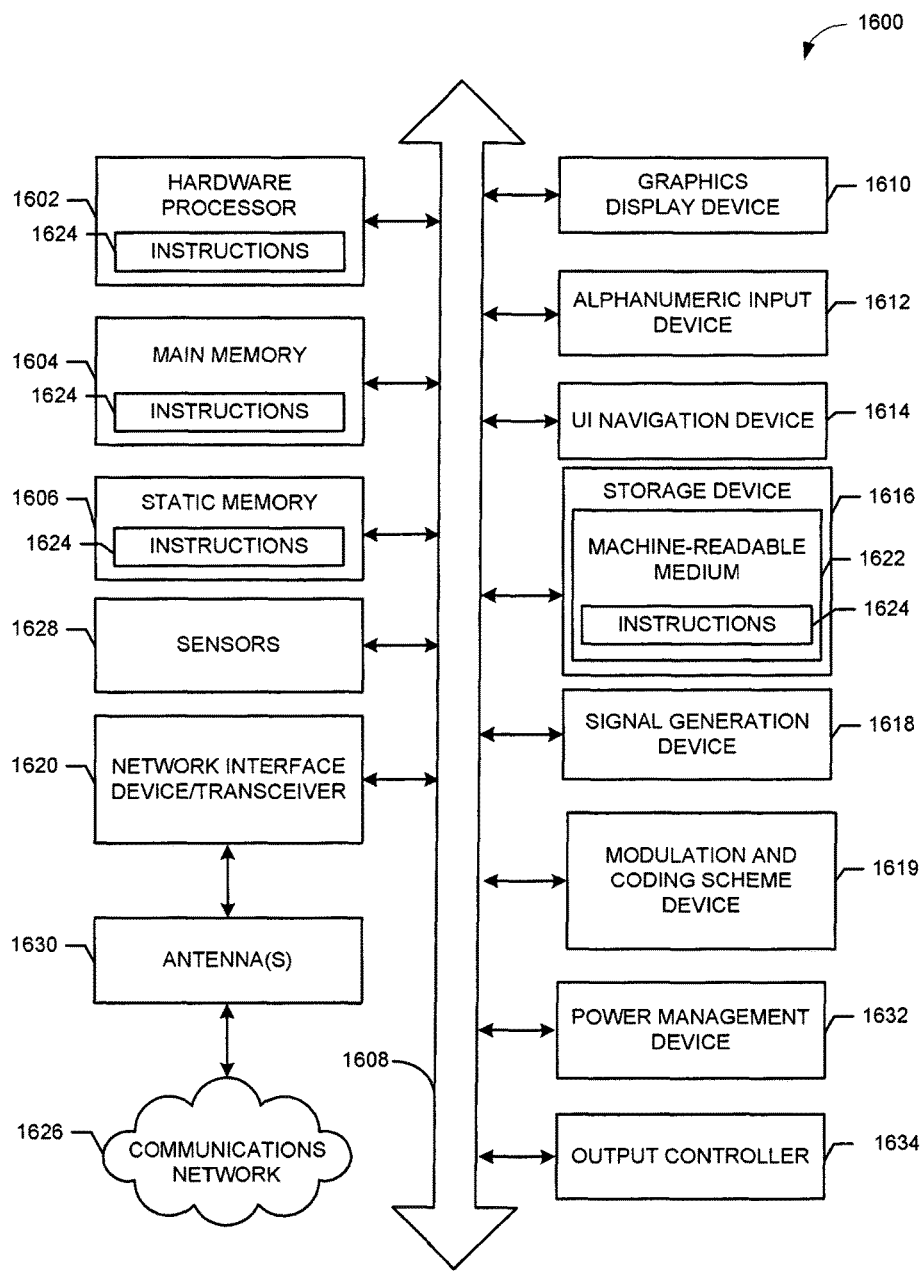
FIG. 16 depicts a block diagram of an example device upon which any of one or more techniques (e.g., methods) of the disclosure may be performed, in accordance with one or more embodiments of the disclosure.

FIG. 16 depicts a block diagram of an example device upon which any of one or more techniques (e.g., methods) may be performed, in accordance with one or more embodiments of the disclosure. In other embodiments, the machine 1600 may operate as a standalone device or may be connected (e.g., networked) to other machines. In a networked deployment, the machine 1600 may operate in the capacity of a server machine, a client machine, or both in server-client network environments. In an example, the machine 1600 may act as a peer machine in peer-to-peer (P2P) (or other distributed) network environments. The machine 1600 may be a personal computer (PC), a tablet PC, a set-top box (STB), a personal digital assistant (PDA), a mobile telephone, a wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1600 may include a hardware processor 1602 (e.g., a central processing unit (CPU), a graphics processing unit (GPU), a hardware processor core, or any combination thereof), a main memory 1604 and a static memory 1606, some or all of which may communicate with each other via an interlink (e.g., bus) 1608. The machine 1600 may further include a power management device 1632, a graphics display device 1610, an alphanumeric input device 1612 (e.g., a keyboard), and a user interface (UI) navigation device 1614 (e.g., a mouse). In an example, the graphics display device 1610, alphanumeric input device 1612, and UI navigation device 1614 may be a touch screen display. The machine 1600 may additionally include a storage device (i.e., drive unit) 1616, a signal generation device 1618 (e.g., a speaker), a modulation and coding scheme (MCS) device 1619, a network interface device/transceiver 1620 coupled to antenna(s) 1630, and one or more sensors 1628, such as a global positioning system (GPS) sensor, a compass, an accelerometer, or other sensor. The machine 1600 may include an output controller 1634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 1616 may include a machine-readable medium 1622 on which is stored one or more sets of data structures or instructions 1624 (e.g., software) embodying or utilized by any one or more of the techniques or functions described herein. The instructions 1624 may also reside, completely or at least partially, within the main memory 1604, within the static memory 1606, or within the hardware processor 1602 during execution thereof by the machine 1600. In an example, one or any combination of the hardware processor 1602, the main memory 1604, the static memory 1606, or the storage device 1616 may constitute machine-readable media.

The MCS device 1619 may carry out or perform any of the operations and processes (e.g., processes 1300 and 1400) described and shown above. For example, the MCS device 1619 may be configured to introduce 64 QAM as an additional modulation for SC over what exists in IEEE 802.11ad. For this modulation, the LDPC code rates may be: 5/8, 3/4, 13/16, 7/8. The rate of 7/8 may require a new LDPC matrix. This rate may be also added to QPSK (between MCS 9 and 10, where a large gap in performance over channels exists). Code rates of 13/16 and 7/8 may also be added to 16 QAM (above MCS 12), where a large gap in performance exists between MCS12 and the 64 QAM code rate 5/8. Current next generation 60 GHz (NG60) and IEEE 802.11 standards do not include these MCSs and the LDPC rate 7/8 code. The 64 QAM MCSs may enable increasing the data rate of SC MCSs without needing to use schemes such as bonding or MIMO. The new QPSK and 16 QAM MCSs may improve link adaptation, because they may decrease the performance gap between MCS9 and MCS10, and between MCS12 and the lowest 64 QAM MCS.

While the machine-readable medium 1622 is illustrated as a single medium, the term "machine-readable medium" may include a single medium or multiple media (e.g., a centralized or distributed database, and/or associated caches and servers) configured to store the one or more instructions 1624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM), random access memory (RAM), magnetic disk storage media, optical storage media, a flash memory, etc.

The term "machine-readable medium" may include any medium that is capable of storing, encoding, or carrying instructions for execution by the machine 1600 and that cause the machine 1600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1624 may further be transmitted or received over a communications network 1626 using a transmission medium via the network interface device/transceiver 1620 utilizing any one of a number of transfer protocols (e.g., frame relay, interne protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1620 may include one or more physical jacks (e.g., Ethernet, coaxial, or phone jacks) or one or more antennas to connect to the communications network 1626. In an example, the network interface device/transceiver 1620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1600 and includes digital or analog communications signals or other intangible media to facilitate communication of such software. The operations and processes (e.g., processes 1300 and 1400) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device," and "user equipment" (UE) as used herein refers to a wireless communication device such as a cellular telephone, a smartphone, a tablet, a netbook, a wireless terminal, laptop computer, a femtocell, a High Data Rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving, the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates a Radio Frequency Identification (RFID) element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

In example embodiments of the disclosure, there may be a device, comprising, among other things, at least one memory storing computer-executable instructions; and at least one processor configured to access the at least one memory, wherein the at least one processor is configured to execute the computer-executable instructions to: receive a source data bit string from the at least one memory; scramble the source data bit string; parse the scrambled source data bit string into a plurality of segments; assign a portion of the plurality of segments to a Single Carrier-Block (SC-BLK); encode the portion of the plurality of segments into a code word, the code word comprising a plurality of bit groups, each bit group comprising one or more bits; determine a number of modulation symbols based at least in part on group size; map each of the plurality of bit groups to a corresponding modulation symbol; group the modulation symbols into an interleaved symbol block associated with the SC-BLK; group the plurality of modulation symbols in the interleaved symbol block into a second code word that corresponds to the first code word; and transmit a packet comprising the interleaved symbol block.

Implementations may include one or more of the following features. The device may further comprise at least one transceiver. The device may further comprise a respective at least one antenna communicatively coupled to each of the at least one transceiver. The at least one processor may be further configured to execute the computer-executable instructions to: determine a number of SC-BLKs needed to transmit the source data bit string. The number of SC-BLKs may be determined based at least in part on the length of the scrambled source data bit string. The at least one processor may be further configured to execute the computer-executable instructions to: map each of the plurality of modulation symbols in the second code word from a first position in the interleaved symbol block to a second position in the interleaved symbol block. The at least one processor may be further configured to execute the computer-executable instructions to: determine the second position at least in part on a floor function applied to a ratio of an integer value corresponding to the first position and the group size. The second position may be based at least in part on the first position, the group size, and an integer value corresponding to the second code word. The code word may be a low density parity check (LDPC) code word. The at least one processor may be further configured to execute the computer-executable instructions to: transmit the packet using a QAM modulation scheme. The QAM modulation scheme may be a 64 QAM modulation scheme and the group size is 16.

In some example embodiments of the disclosure, there may be a non-transitory computer-readable medium storing computer-executable instructions which when executed by one or more processors result in performing operations comprising: receiving a source data bit string; scrambling the source data bit string; parsing the scrambled source data bit string into a plurality of segments; assigning a portion of the plurality of segments to a Single Carrier-Block (SC-BLK); encoding the portion of the plurality of segments into a code word, the code word comprising a plurality of bit groups, each bit group comprising one or more bits; determining a number of modulation symbols based at least in part on group size; mapping each of the plurality of bit groups to a corresponding modulation symbol; grouping the modulation symbols into an interleaved symbol block associated with the SC-BLK; grouping the plurality of modulation symbols in the interleaved symbol block into a second code word that corresponds to the first code word; and transmitting a packet comprising the interleaved symbol block.

The packet may further comprise a header field and a preamble field. The SC-BLK may also comprise a guard interval and the interleaved symbol block. The SC-BLK may be included in a data payload field of the packet. The interleaved symbol block may comprise a group of four code words including the second code word. The group of four code words may include one or more low density parity check (LDPC) code words.

In example embodiments of the disclosure, there may be a method. The method may comprise: receiving a source data bit string; scrambling the source data bit string; parsing the scrambled source data bit string into a plurality of segments; assigning a portion of the plurality of segments to a Single Carrier-Block (SC-BLK); encoding the portion of the plurality of segments into a code word, the code word comprising a plurality of bit groups, each bit group comprising one or more bits; determining a number of modulation symbols based at least in part on the group size; mapping each of the plurality of bit groups to a corresponding modulation symbol; grouping the modulation symbols into an interleaved symbol block associated with the SC-BLK; grouping the plurality of modulation symbols in the interleaved symbol block into a second code word that corresponds to the first code word; and transmitting a packet comprising the interleaved symbol block.

The method may further comprise mapping the corresponding modulation symbols in the second code word from a first position to a second position in the interleaved symbol block. The second position may be equal to the sum of: the product of four, the group size, and a floor function applied to a ratio of the first position and the group size; the product of an index value corresponding to the code word and the group size; and a modulus operator applied to the first position and the group size.

In example embodiments of the disclosure, there may be a device comprising: means for receiving a source data bit string from the at least one memory; means for scrambling the source data bit string; means for parsing the scrambled source data bit string into a plurality of segments; means for assigning a portion of the plurality of segments to a Single Carrier-Block (SC-BLK); means for encoding the portion of the plurality of segments into a code word, the code word comprising a plurality of bit groups, each bit group comprising one or more bits; means for determining a number of modulation symbols based at least in part on the group size; means for mapping each of the plurality of bit groups to a corresponding modulation symbol; means for grouping the modulation symbols into an interleaved symbol block associated with the SC-BLK; means for grouping the plurality of modulation symbols in the interleaved symbol block into a second code word that corresponds to the first code word; and means for transmitting a packet comprising the interleaved symbol block.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product comprising a computer-readable storage medium, having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams and combinations of blocks in the block diagrams and flow diagrams can be implemented by special-purpose, hardware-based computer systems that perform the specified functions, elements, steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
   at least one memory storing computer-executable instructions; and
   at least one processor configured to access the at least one memory, wherein the at least one processor is configured to execute the computer-executable instructions to:
   receive a source data bit string from the at least one memory;
   scramble the source data bit string;
   parse the scrambled source data bit siting into a plurality of segments;
   assign a portion of the plurality of segments to a Single Carrier-Block (SC-BLK);
   encode the portion of the plurality of segments into a code word, the code word comprising a plurality of bit groups, each bit group comprising one or more bits:
   determine a number of modulation symbols based at least in part on group size;
   map each of the plurality of bit groups to a corresponding modulation symbol;
   group the modulation symbols into an interleaved symbol block associated with the SC-BLK;
   group the modulation symbols in the interleaved symbol block into a second code word that corresponds to the first code word;
   map each of the modulation symbols in the second code word from a first position in the interleaved symbol block to a second position in the interleaved symbol block, based on an integer value corresponding to the first position and the group size; and transmit a packet comprising the interleaved symbol block.

2. The device of claim 1, further comprising at least one transceiver.

3. The device of claim 2, further comprising a respective at least one antenna communicatively coupled to each of the at least one transceiver.

4. The device of claim 1, wherein the at least one processor is further configured to execute the computer-executable instructions to:
determine a number of SC-BLKs needed to transmit the source data bit string.

5. The device of claim 4, wherein the number of SC-BLKs is determined based at least in part on the length of the scrambled source data bit string.

6. The device of claim 1, wherein the at least one processor is further configured to execute the computer-executable instructions to: determine the second position at least in part on a floor function applied to a ratio of the integer value corresponding to the first position and the group size.

7. The device of claim 6, wherein the second position is based at least in part on the first position, the group size, and an integer value corresponding to the second code word.

8. The device of claim 1, wherein the code word is a low density parity check (LDPC) code word.

9. The device of claim 1, wherein the at least one processor is further configured to execute the computer-executable instructions to:
transmit the packet using a QAM modulation scheme.

10. The device of claim 9, wherein the QAM modulation scheme is a 64 QAM modulation scheme and the group size is 16.

11. A non-transitory computer-readable medium storing computer-executable instructions which when executed by one or more processors result in performing operations comprising:
receiving a source data bit string;
scrambling the source data bit string;
parsing the scrambled source data bit string into a plurality of segments;
assigning a portion of the plurality of segments to a Single Carrier-Block (SC-BLK);
encoding the portion of the plurality of segments into a code word, the code word comprising a plurality of bit groups, each bit group comprising one or more bits;
determining a number of modulation symbols based at least in part on group size;
mapping each of the plurality of bit groups to a corresponding modulation symbol;
grouping the modulation symbols into an interleaved symbol block associated with the SC-BLK;
grouping the modulation symbols in the interleaved symbol block into a second code word that corresponds to the first code word;
mapping each of the modulation symbols in the second code word from a first position in the interleaved symbol block to a second position in the interleaved symbol block, based on an integer value corresponding to the first position and the group size; and
transmitting a packet comprising the interleaved symbol block.

12. The non-transitory computer-readable medium of claim 11, wherein the packet further comprises a header field and a preamble field.

13. The non-transitory computer-readable medium of claim 11, wherein the SC-BLK comprises a guard interval and the interleaved symbol block.

14. The non-transitory computer-readable medium of claim 13, wherein the SC-BLK is included in a data payload field of the packet.

15. The non-transitory computer-readable medium of claim 13, wherein the interleaved symbol block comprises a group of four code words including the second code word.

16. The non-transitory computer-readable medium of claim 15, wherein the group of four code words includes one or more low density parity check (LDPC) code words.

17. A method comprising:
receiving a source data bit string;
scrambling the source data bit string;
parsing the scrambled source data bit string into a plurality of segments;
assigning a portion of the plurality of segments to a Single Carrier-Block (SC-BLK);
encoding the portion of the plurality of segments into a code word, the code word comprising a plurality of bit groups, each bit group comprising one or more bits;
determining a number of modulation symbols based at least in part on group size;
mapping each of the plurality of bit groups to a corresponding modulation symbol;
grouping the modulation symbols into an interleaved symbol block associated with the SC-BLK;
grouping the modulation symbols in the interleaved symbol block into a second code word that corresponds to the first code word;
mapping each of the modulation symbols in the second code word from a first position in the interleaved symbol block to a second position in the interleaved symbol block, based on an integer value corresponding to the first position and the group size; and
transmitting a packet comprising the interleaved symbol block.

18. The method of claim 17, wherein the second position is equal to the sum of:
the product of four, the group size, and a floor function applied to a ratio of the first position and the group size;
the product of an index value corresponding to the code word and the group size; and
a modulus operator applied to the first position and the group size.

* * * * *